United States Patent [19]
Johnson

[11] Patent Number: 5,967,666
[45] Date of Patent: Oct. 19, 1999

[54] AIR BEARING ASSEMBLY

[75] Inventor: Robert P. Johnson, Mt. Zion, Ill.

[73] Assignee: Airfloat/HSI Systems, Inc., Decatur, Ill.

[21] Appl. No.: 09/063,597

[22] Filed: Apr. 21, 1998

[51] Int. Cl.[6] .............................. B60V 1/11; B60V 1/04; F16C 32/06
[52] U.S. Cl. .............................. 384/12; 180/116; 180/124
[58] Field of Search .............................. 384/12, 100, 121, 384/124, 15; 180/125, 127, 116, 124; 198/493

[56] References Cited

U.S. PATENT DOCUMENTS 3,653,458  4/1972  Donlon ..................................... 180/124

FOREIGN PATENT DOCUMENTS

1389174-A1  2/1986  U.S.S.R. ................................. 180/125
2092084     2/1982  United Kingdom .................. 180/125

*Primary Examiner*—Thomas R. Hannon
*Assistant Examiner*—Colby Hansen
*Attorney, Agent, or Firm*—Philip L. Bateman

[57] ABSTRACT

An air bearing assembly transports loads across a smooth and flat surface when pressurized with air. The air bearing assembly includes a frame and an air bearing. The frame has a flat side for supporting a load and has an inner ring extending from its other side. The air bearing includes a backing plate and a flexible diaphragm that forms an enclosed footprint on the surface when pressurized. The footprint of the diaphragm uniformly overlap the ring of the frame. A damping chamber is formed by the inner ring of the frame and by the backing plate. The damping chamber is sealed when the diaphragm is pressurized by the upward force exerted by the diaphragm upon the backing plate against the inner ring.

20 Claims, 5 Drawing Sheets

AIR BEARING ASSEMBLY

FIELD OF THE INVENTION

This invention relates to air bearing assemblies. More particularly, this invention relates to air bearing assemblies for transporting heavy loads across a smooth and flat surface.

BACKGROUND OF THE INVENTION

Wheels and casters are commonly used to reduce friction as heavy loads are transported on a frame or platform across a surface. When a source of pressurized air is available and the surface is relatively smooth and flat, air bearings can be used in place of wheels and casters. An air bearing is a flexible diaphragm with one or more small air exit holes that is sealed around its periphery and attached at its center to a lightweight backing plate. Pressurized air flows into the interior of the air bearing and inflates it. The air leaving the diaphragm through the exit holes first enters a plenum space under the diaphragm and then flows to the atmosphere. The continuously flowing film of air between the diaphragm and the surface allows friction to be virtually eliminated during transport.

Air bearings are made in many different sizes and shapes, including circular, square, and "racetrack." Air bearings are used with a supporting frame or platform. The combination of an air bearing and a frame is commonly known as an air bearing assembly. The frame typically contains two parallel plates separated by a small distance. The load rests on the upper plate while the lightweight backing plate of the air bearing is supported by the lower plate. Air bearings are used in a variety of air bearing assembly configurations. For example, air bearings are individually mounted to frames and used singly or, more commonly, in sets of three or more under heavy equipment. Air bearings are also used under moving platforms and rotating turntables. Air bearings can carry tremendous loads, for example, a round air bearing having a diameter of about 4 ft (1.2 m) can carry a load of about 40,000 lbs (18,200 kg). The air pressure in the diaphragm is a function of the load carried and does not depend on the inlet air pressure. The diaphragm will overinflate and may burst if the load capacity is exceeded.

A variety of operating conditions can cause pressure fluctuations to occur in the diaphragm of an air bearing. Rapid pressure fluctuations, in turn, can cause individual air bearings to bounce or "hop" and can cause a load resting on a set of air bearings to rock or sway. Common operating conditions that are believed to cause hopping and rocking include, but are not limited to, fluctuations in the pressurized air source itself, shifting of the load on the air bearing, and passing of the air bearing(s) over non-uniform surfaces. More particularly, if the surface over which the air bearing moves is not perfectly smooth, some of the exit holes may be temporarily blocked which, in turn, causes a non-uniform flow of air from the exit holes of the diaphragm. To eliminate or reduce hopping and rocking, most air bearings are used in conjunction with a damping chamber. A damping chamber is a sealed chamber with an orifice between it and the interior of the air bearing. The two-way air flow between the diaphragm and the damping chamber, together with the inherent compressibility of air, greatly reduces pressure fluctuations in the diaphragm.

Unfortunately, damping chambers add to the cost, weight, and manufacturing complexity of frames for air bearing assemblies. Damping chambers are sealed pressure vessels that are strong enough to withstand the pressure differential between the operating pressure of the air bearing and atmospheric pressure. Damping chambers are either purchased or fabricated by welding or other time-consuming and expensive process. They are often mounted on the frame of an air bearing assembly between the upper and lower plates. When added to the frame in this manner, the damping chamber makes little or no contribution to the frame's structural strength.

An air bearing assembly is disclosed in Burdick, U.S. Pat. No. 3,756,342, issued Sep. 4, 1973, which is incorporated by reference. The Burdick air bearing assembly contains a flexible diaphragm and a backing plate. The air bearing slides in and out from under a load carrying platform. The load carrying platform contains a sealed damping chamber which is presumably formed by welding. The damping chamber also contains a small orifice that communicates through a corresponding hole in the backing plate with the interior of the diaphragm. A gasket is placed between the orifice and the backing plate. The gasket is sealed by the deformation of the backing plate and, when the air bearing is pressurized, by the load.

It would be a major improvement if an air bearing assembly were provided that has an integral damping chamber that is easily and simply manufactured and whose seal is created by the pressurization of the air bearing.

SUMMARY OF THE INVENTION

The general object of this invention is to provide an improved air bearing assembly. A more particular object is to provide a lightweight air bearing assembly with an integral damping chamber that is easily and simply manufactured and whose seal is created by the pressurization of the air bearing.

I have invented an improved air bearing assembly for transporting loads across a smooth and flat surface. The air bearing assembly comprises a frame and an air bearing. The frame of the assembly has a first side for supporting a load, an opposing second side, an inner ring extending from the second side for partially defining a damping chamber, a mount centrally located within the inner ring for attaching an air bearing, a pressurized air inlet, a pressurized air outlet within the inner ring, and a pressurized air conduit communicating between the pressurized air inlet and the pressurized air outlet.

The air bearing of the assembly comprises: (i) a substantially flat backing plate connected to the second side of the frame in an overhanging relationship with the inner ring so that the backing plate has an overhanging area and a non-overhanging area and so that an enclosed damping chamber is defined by the frame and the backing plate, the backing plate having a lip along its periphery, a central mounting hole, a hole within the non-overhanging area through which the pressurized air conduit extends, and an orifice within the non-overhanging area; and (ii) a flexible bulbous diaphragm having a periphery attached to the lip of the backing plate and having a center attached to the backing plate and to the mount of the frame to create an interior space in the diaphragm and an enclosed footprint upon the surface when the air bearing assembly is pressurized, the interior space communicating with the pressurized air outlet and also communicating with the damping chamber through the orifice in the backing plate, the footprint having a size that uniformly overhangs the inner ring so that the footprint has an overhanging area and a non-overhanging area, the overhanging area being less than the non-overhanging area, the diaphragm further having one or more exit holes within the footprint for the flow of air from the interior space in the diaphragm to the atmosphere, the combined cross-sectional areas of the exit holes being substantially less than the cross-sectional area of the conduit so that pressure is maintained in the diaphragm.

The air bearing assembly of this invention contains an integral damping chamber. The frame of the assembly is relatively lightweight and can be manufactured by casting, making it much easier and less expensive to manufacture than conventional frames and damping chambers. When the air bearing assembly is pressurized, the damping chamber is sealed by an upward force exerted by the diaphragm upon the backing plate against the inner ring.

DETAILED DESCRIPTION OF THE INVENTION

1. The Invention In General

Figure 1:
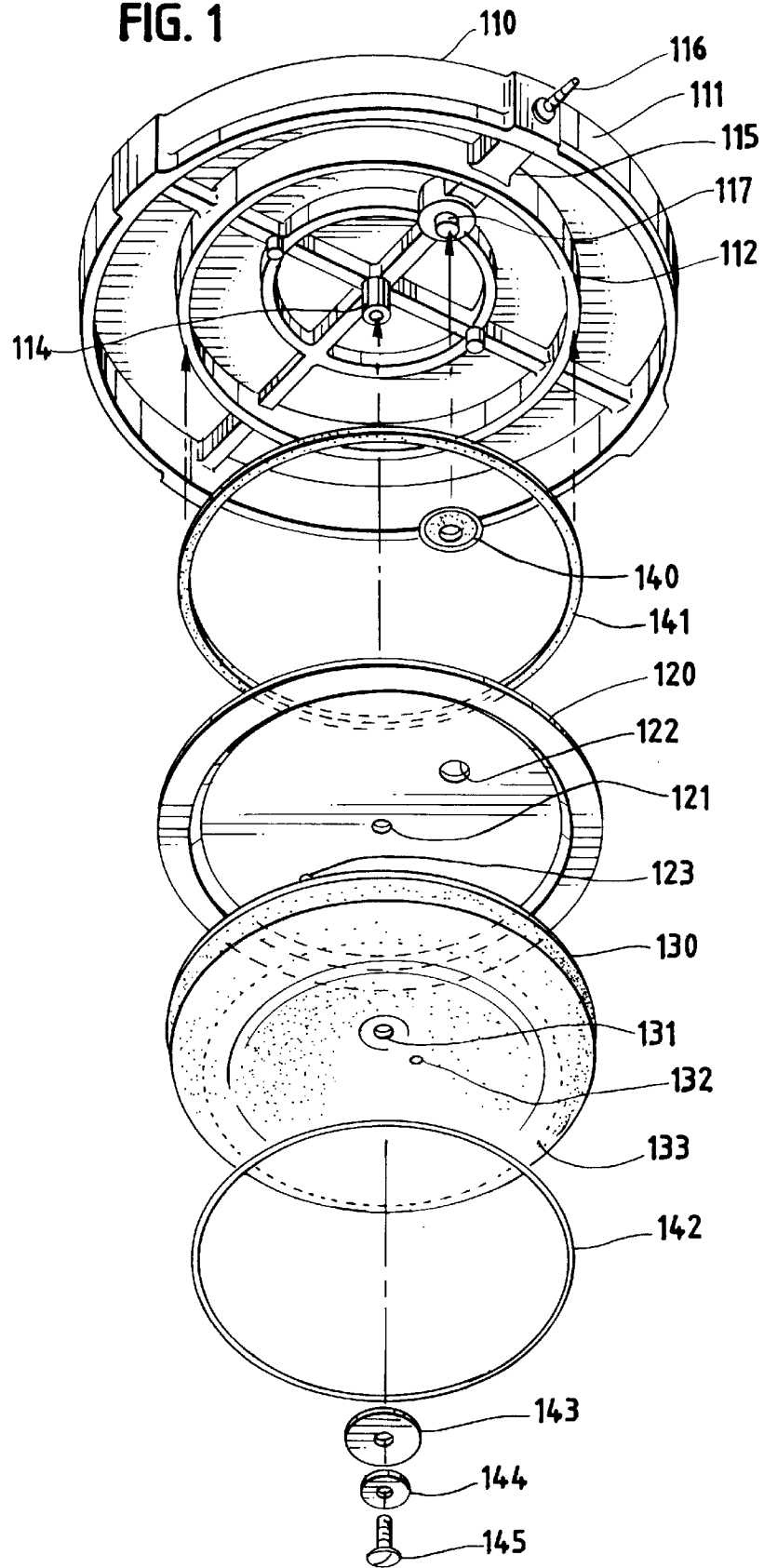
FIG. 1 is an exploded bottom perspective view of the preferred embodiment of the air bearing assembly of this invention.
Figure 2:
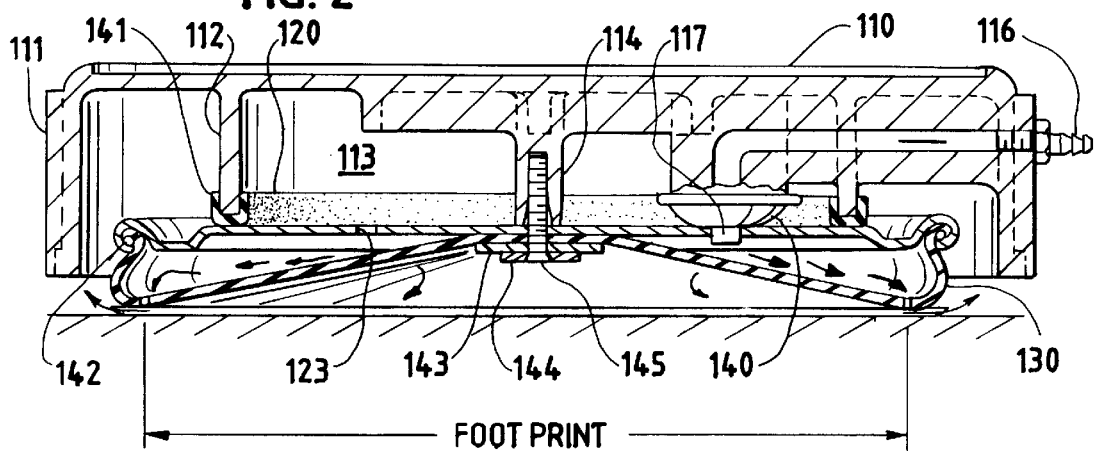
FIG. 2 is a sectional elevational view of the assembled air bearing assembly shown in FIG. 1.

This invention is best understood by reference to the drawings. Referring to FIGS. 1 and 2, the preferred embodiment of the air bearing assembly 100 of this invention includes a frame 110, a backing plate 120, and a flexible diaphragm 130. The backing plate and the flexible diaphragm together are commonly referred to as the air bearing itself. The air bearing assembly also includes several other items, including seal 140 and gasket 141 that fit between the frame and the backing plate, a metal ring 142 that helps connect the periphery of the diaphragm to the backing plate, center clamping plates 143 and 144, and a mounting screw 145 that connects the air bearing and the frame together. Each of the components of the air bearing assembly is discussed in detail below.

When the air bearing assembly is assembled as shown in FIG. 2 and connected to a source of pressurized air, a sealed damping chamber and a continuously flowing film of air between the diaphragm and the floor are created. The air bearing assembly is commonly in the position shown in FIG. 2 during transport, namely, horizontal with the load (not shown) on top of the frame and the air bearing under the frame. For this reason, the air bearing assembly is generally described in this orientation. However, the air bearing assembly functions equally well in other positions, including inverted and vertical.

2. The Frame

The frame 110 supports the load that is transported by the air bearing assembly. The frame is generally planar and, as stated above, is typically in a horizontal position during transport with the load resting on the topside of the frame and the air bearing attached to the underside. The topside surface on which the load rests is generally flat. The underside surface holds the air bearing and contains the damping chamber.

The frame is constructed of a strong rigid material such as metal, plastic, carbon fiber, and the like. The preferred material is metal and the most preferred metal is aluminum because of its strength, light weight, and ability to be cast. The size and shape of the frame is a matter of choice that depends on many factors, including the size and weight of the load to be transported, the size of the air bearing to be attached to the frame, etc. The preferred embodiment of the frame shown in FIGS. 1 and 2 is round with a diameter of about 20 in (51 cm). The frame is cast of 319F aluminum and the planar portion has a thickness of about 0.4 in (1 cm).

The frame preferably contains one or more support members that support the load when the air bearing is deflated, i.e., not pressurized. When the air bearing is pressurized and inflated, the support member is lifted off the floor. In the preferred embodiment shown in FIGS. 1 and 2, the support member is an outer ring 111 that descends from the underside of the frame a distance of about 2.5 in (6 cm). The outer ring is circular and has a thickness of about 0.4 in (1 cm).

The frame also contains an inner ring 112 that descends from the underside of the frame. The interior of the inner ring partially defines, and fixes the dimensions of, the damping chamber 113. In the preferred embodiment shown in FIGS. 1 and 2, the inner ring is circular, descends from the underside of the frame a distance of about 1.75 in (4.5 cm), has a diameter of about 14 in (35.5 cm), and has a wall thickness of about 0.4 in (1 cm). The inner ring does not carry the load so it need only be strong enough to withstand the operating pressure to be encountered. The volume of the damping chamber shown is about 275 $in^3$ (4.5 1). The efficiency of the damping chamber in reducing hopping and rocking is a function of its volume. However, the incremental improvement in efficiency declines as the volume increases. Therefore, a point is reached where the additional size, weight, and cost for a larger damping chamber is not justified by the improvement in efficiency at reducing hopping and rocking.

Centrally located within the inner ring is a mount 114 with internal threads. The mount descends from the underside of the frame a distance equal to or slightly less than the inner ring so that it does not interfere with the backing plate. The mount shown in FIGS. 1 and 2 is a post, but other structures are suitable.

The frame further contains a conduit 115 for the flow of pressurized air. The inlet 116 of the conduit is located at the outside side of the frame and preferably consists of a threaded boss and a standard air hose fitting. The conduit runs from outside the frame to an outlet 117 in the interior of the inner ring. As will be seen, the outlet communicates with the interior of the diaphragm.

The frame shown in FIGS. 1 and 2 is a self-contained unit upon which a load can be directly placed. In the air bearing industry, such a frame is commonly known as an air bearing skid or an air bearing module. While a single air bearing assembly can be used under a load, the resulting poor stability is similar to that of a load on a single wheel or caster. Accordingly, better results are obtained by using three or more assemblies under a load so that the load on each air bearing assembly is balanced. The air inlets to the assemblies are typically connected by a common manifold to facilitate control from a single location.

3. The Backing Plate

The backing plate 120 of the air bearing connects to the underside of the frame containing the descending inner ring and fits between the inner ring and the diaphragm. The damping chamber of the air bearing assembly is the enclosed space defined by the frame and the backing plate. The backing plate "overhangs" the inner ring, i.e., it extends out beyond the inner ring when it is attached to the frame. The overhang divides the backing plate into an area that overhangs the inner ring and an area that does not overhang the inner ring, i.e., an area that is within the inner ring. The term "overhang" is used even though, in the most common orientation, the backing plate is actually located below the inner ring. The purpose of the overhang is discussed in the following section.

The backing plate is preferably a substantially planar, semi-rigid, lightweight sheet of material such as metal or plastic. Heavier and more rigid sheets of material are suitable, but are unnecessary and add to the weight and cost of the air bearing assembly. The backing plate of the preferred embodiment shown in FIGS. 1 and 2 is a circular piece of 18 gauge galvanized steel having a diameter of about 18 in (46 cm). The plate contains a central hole 121 for attaching the plate to the mounting post of the frame. It also contains an air inlet hole 122 for the introduction of pressurized air into the air bearing and an orifice 123 for air flow between the air bearing and the damping chamber. The diameter of the orifice shown in FIGS. 1 and 2 is about 0.1 in (3 mm). The optimal diameter of the orifice depends on many factors, including, but not limited to, the load and on the sizes of the damping chamber and diaphragm. If the load may vary, it is advantageous for the orifice diameter to be adjustable. For example, the use of interchangeable plugs with external threads and varying-sized orifices that mate with a threaded opening in the plate is a convenient adjustment means for the orifice diameter.

A compliant gasket is generally placed between the backing plate and the inner ring of the frame to help ensure an airtight seal. The inner ring gasket is preferably constructed of an elastomeric material such as polyurethane foam or dense foam rubber. A seal is also generally placed between the pressurized air outlet and the backing plate. The load required to seal a compliant gasket deflects the relatively lightweight backing plate to a point where it may lose its seal at the air outlet. Accordingly, the preferred air outlet seal is an elastomeric pneumatic inlet seal as shown in FIGS. 1 and 2. The pressurized air inflates the inlet seal and helps create a seal against the top of the backing plate. Seals of this type are commercially available from Airfloat Systems, Inc. of Decatur, Ill. The gasket and the seal are preferably secured in position by adhesive or the like. The backing plate contains a lip along its periphery for engaging the flexible diaphragm. The lip is explained in more detail in the following section.

4. The Flexible Diaphragm

The flexible diaphragm 130 is conventional in construction and function. When the air bearing is pressurized, air enters the diaphragm through the air conduit to inflate the diaphragm and leaves the diaphragm through one or more exit holes. Relatively small volumes of air also flow into and out of the damping chamber through the orifice in the backing plate. The inflated diaphragm has a bulbous shape with a center indentation, as best seen in FIG. 2. It can also be seen in FIG. 2 that the diaphragm forms an enclosed "footprint" upon the surface. The diameter of the footprint is indicated in FIG. 2. The footprint expands slightly as the internal pressure in the diaphragm increases, and contracts slightly as the internal pressure decreases. However, the change in the footprint with varying pressure is very small so the size of the footprint is essentially constant throughout the operating range of pressure.

The diaphragm of the preferred embodiment shown in FIGS. 1 and 2 contains a central mounting hole 131, one major exit hole 132 located near the center, and about 40 smaller exit holes 133 located a greater distance radially outward. It can be seen that all the exit holes are located within the footprint so that the air exiting the holes helps create the film between the diaphragm and the surface. The major hole has a diameter of about 0.4 in (1 cm) and the smaller holes have a diameter of about 0.1 in (2 mm). The combined cross-sectional areas of the exit holes are substantially less than the cross-sectional area of the conduit so that air flow through the diaphragm is restricted and pressure is maintained in the diaphragm. The diaphragm shown in FIGS. 1 and 2 is made of polyurethane having a wall thickness of about 0.04 in (1 mm). The diaphragm is cut from a flat sheet and then vacuum formed to create the rounded shape and peripheral edge.

The diaphragm is attached to the backing plate along its periphery. In the embodiment shown in FIGS. 1 and 2, the edge of the diaphragm is placed into a channel along the peripheral lip of the backing plate, the metal ring is inserted into the channel, and then the outside edge of the channel is folded over. A number of other suitable fastening equipment and methods are known and used in the air bearing industry, including staples, clips, and the like. The diaphragm is also attached to the backing plate at the center with the clamping plates and the screw.

The footprint of the diaphragm uniformly overhangs the inner ring. As mentioned in connection with the backing plate, the term "overhang" means that the footprint would extend out beyond the inner ring if they were superimposed upon each other in a concentric relationship. The overhang divides the diaphragm's footprint into an area that overhangs the inner ring and an area that does not overhang the inner ring. The uniform overhang of the diaphragm's footprint helps create an upward force against the plate that is uniformly distributed to the inner ring when the air bearing is pressurized. When the inner ring is circular in shape, the footprint of the diaphragm is typically circular as well. However, a uniform overhang is also formed with centrally positioned square or racetrack air bearings.

As previously mentioned, the pressure in the air bearing is a function of the load and the pressure in the damping chamber is essentially the same as the pressure in the air bearing. If the size and shape of the diaphragm's footprint were exactly the same as the inner ring, there would be no net force on the plate because the pressure above and below the plate are the same. It would be very difficult to create an airtight seal where the backing plate meets the inner ring in this situation. In contrast, the overhang of the diaphragm's footprint and the backing plate is responsible for an upward force against the backing plate that creates a seal between the backing plate and the inner ring. It can be seen that the air above the overhang area is at atmospheric pressure while the air pressure in the diaphragm below the overhang area is typically about 2 to 50 psig. This pressure differential creates the upward force against the backing plate. The magnitude of this force is equal to the pressure of the air bearing multiplied by the surface area of the footprint overhang. As an example, if the pressure in the diaphragm of the embodiment shown in FIGS. 1 and 2 is 30 psig, the upward force against the backing plate is given by the following formula:

Force=(Area of Footprint Overhang) (Diaphragm Pressure)

Force=(Area of Footprint−Area of Inner Ring) (Diaphragm Pressure)

Force=[$\pi$(Footprint radius)$^2$ −$\pi$(Inner Ring Radius)$^2$] (30 lbs force/in$^2$)

Force=[π(8 in)² −π(7 in)²] (30 lbs force/in²)

Force≈(201 in² −154 in²) (30 lbs force/in²)

Force≈(47 in²) (30 lbs force/in²)

Force≈1,400 lbs force

In the preferred embodiment shown in FIGS. 1 and 2, the overhanging area of the footprint is about 47 in² and the non-overhanging area is about 154 in². The overhanging area is generally less than the non-overhanging area and is preferably about 10 to 50%, most preferably about 20 to 40%, of the non-overhanging area. An excessive overhang is undesirable because it increases the size of the frame without increasing the size of the damping chamber and because it requires the periphery of the backing plate to be strong enough to resist being bent upward by the pressure differential. It can be seen that the overhang of the backing plate is necessary because the backing plate holds the diaphragm. In the preferred embodiment shown in FIGS. 1 and 2, the diameter of the backing plate is about 18 in (46 cm).

5. Alternate Embodiments

FIGS. 3 to 10 illustrate some of the alternate embodiments of the air bearing assembly of this invention.

Figure 3:
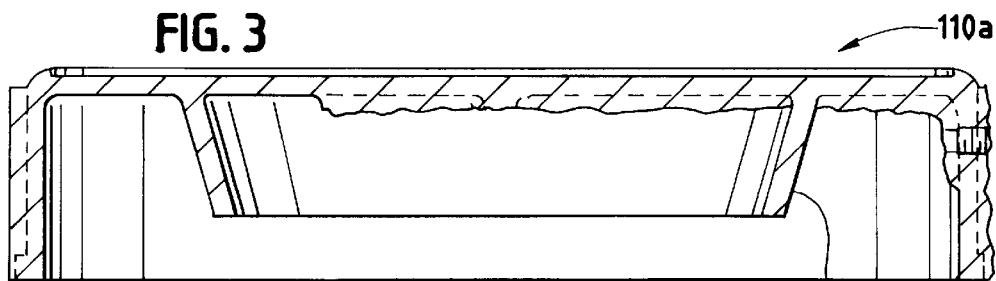
FIGS. 3 to 6 are sectional elevational views of alternative embodiments of the frame.
Figure 4:
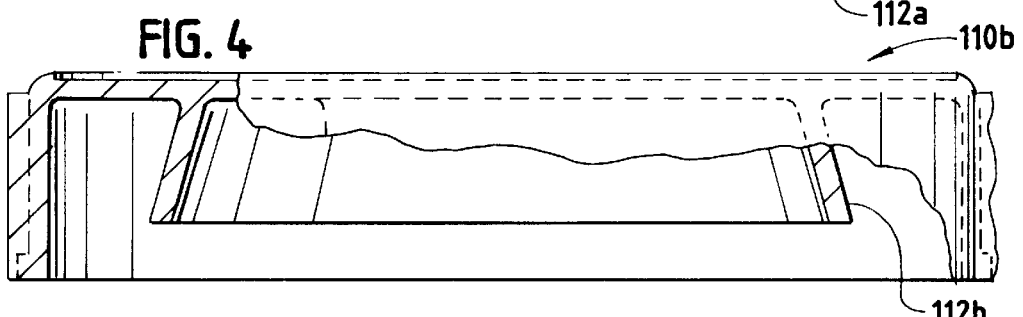
Figure 5:
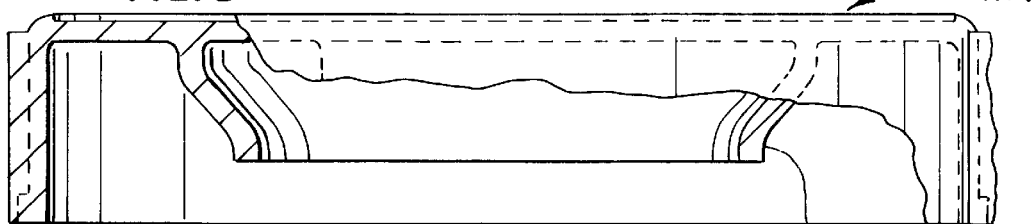
Figure 6:
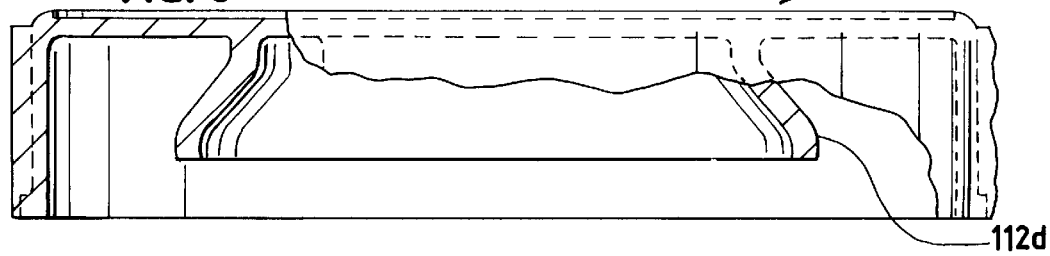

In the embodiment shown in FIGS. 1 and 2, the inner ring is perpendicular to the planar portion of the frame. In other words, the inner ring wall is vertical when the frame is horizontal. A perpendicular inner ring is preferred for two reasons. First, the perpendicular position provides the greatest strength, other things being equal. Second, the perpendicular position is the easiest to manufacture by casting or by fabrication. Non-perpendicular rings are, however, suitable. Four frames with non-perpendicular rings are shown in section in FIGS. 3 to 6. In FIG. 3, the inner ring descends inwardly to create a damping chamber having a larger volume for a given opening. In FIG. 4, the inner ring descends outwardly to create a damping chamber having a smaller volume for a given opening. Even greater changes in the damping chamber volume are obtained by curving the inner ring inwardly, as shown in FIG. 5, or outwardly, as shown in FIG. 6.

Figure 7:
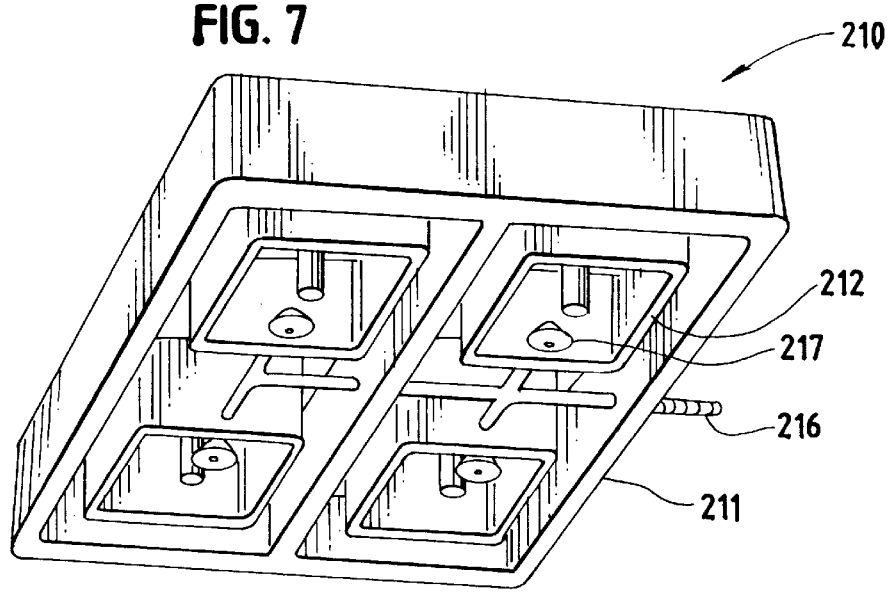
FIG. 7 is a bottom plan view of the frame only of an alternative embodiment of the air bearing assembly of this invention.

The frame of another embodiment of the air bearing assembly is shown in FIG. 7. This frame 210 contains four descending square inner rings 212 to hold four separate air bearings, each of which has its own damping chamber. The frame contains a descending outer ring 211 about its periphery and a centered rib for supporting the load when the air bearings are not pressurized. Because this frame contains four air bearings, each individual air bearing is balanced even if the load is not evenly distributed on the topside of the frame.

Figure 8:
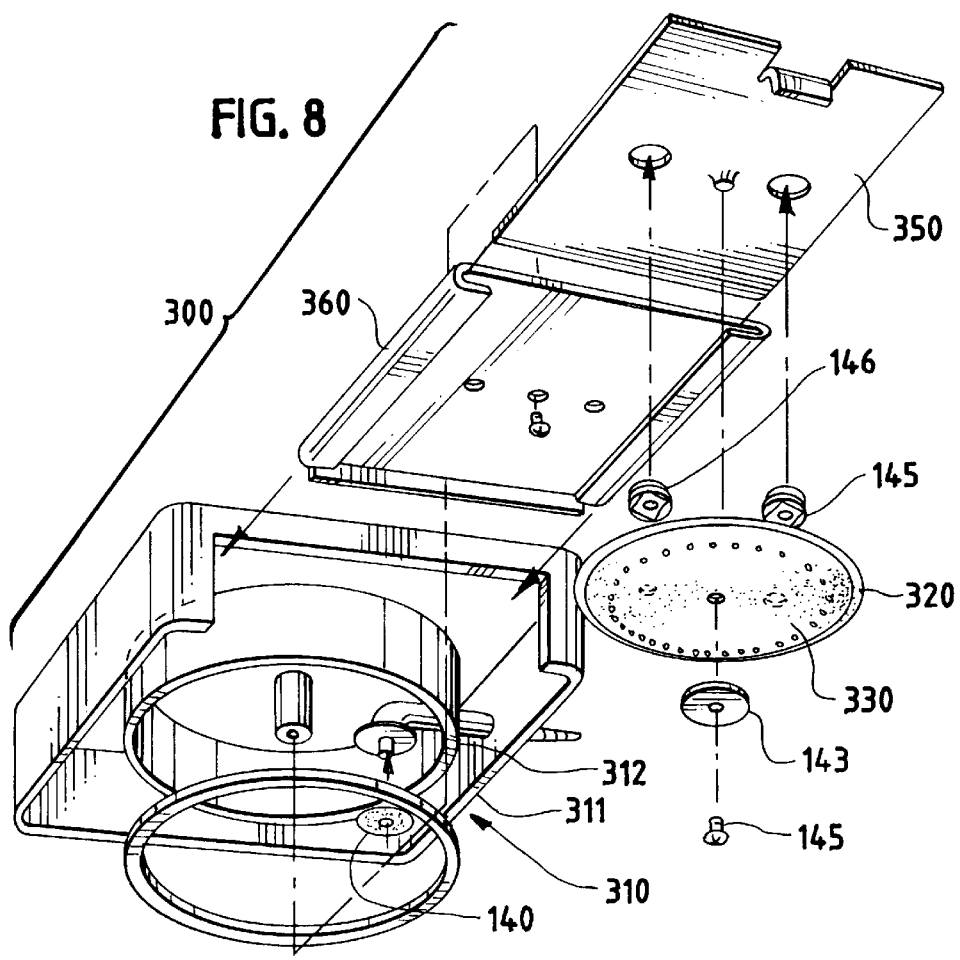
FIG. 8 is a partially exploded bottom perspective view of an alternative embodiment of the air bearing assembly of this invention.

Another embodiment of the air bearing assembly of this invention is shown in FIG. 8. As with the other frames, this frame 310 contains a descending circular inner ring 312 to hold an air bearing. This frame also contains a descending outer ring 311 around three sides of its square periphery for supporting the load when the air bearing is not pressurized. This assembly includes an air bearing consisting of a backing plate 320 and flexible diaphragm 330. The assembly differs from the first two embodiments in having a tray 350 and a socket 360 that fit between the frame and the air bearing. The assembly also contains three pneumatic inlet seals 140, 145, and 146. The air bearing is attached to the tray and the socket is attached to the frame. This construction enables the air bearing and tray to be quickly and easily slid out from under the frame, even when a load is on the frame.

Figure 9:
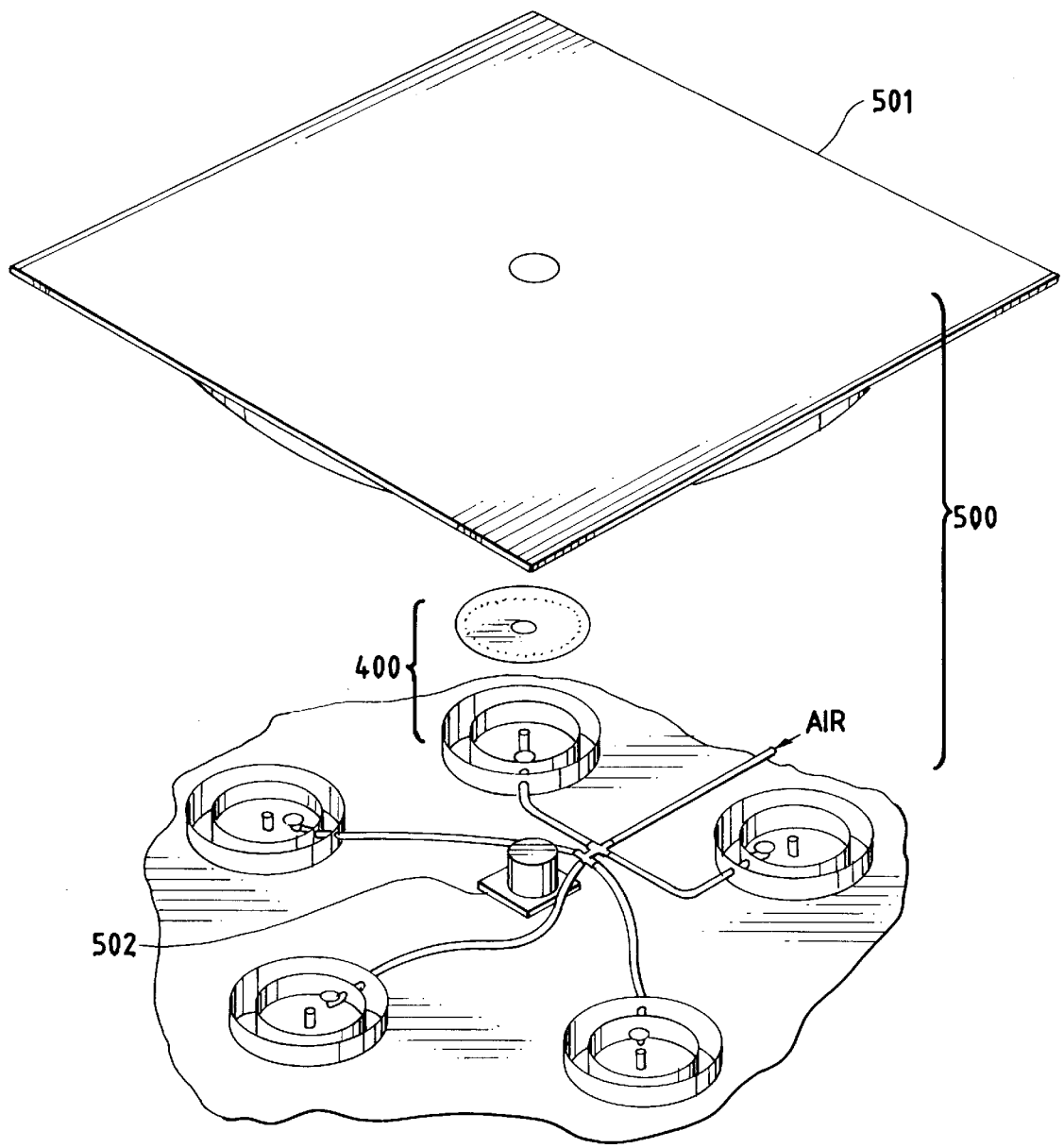
FIG. 9 is an exploded perspective view of a turntable having five identical air bearing assemblies resting on a floor.

FIG. 9 illustrates a first rotating turntable assembly 500. The turntable top 501 is centered on a fixed floor pivot 502 and rotates upon five air bearing assemblies 400 resting on the floor. Each of the air bearing assemblies is similar in construction to the assembly shown in FIGS. 1 and 2.

Figure 10:
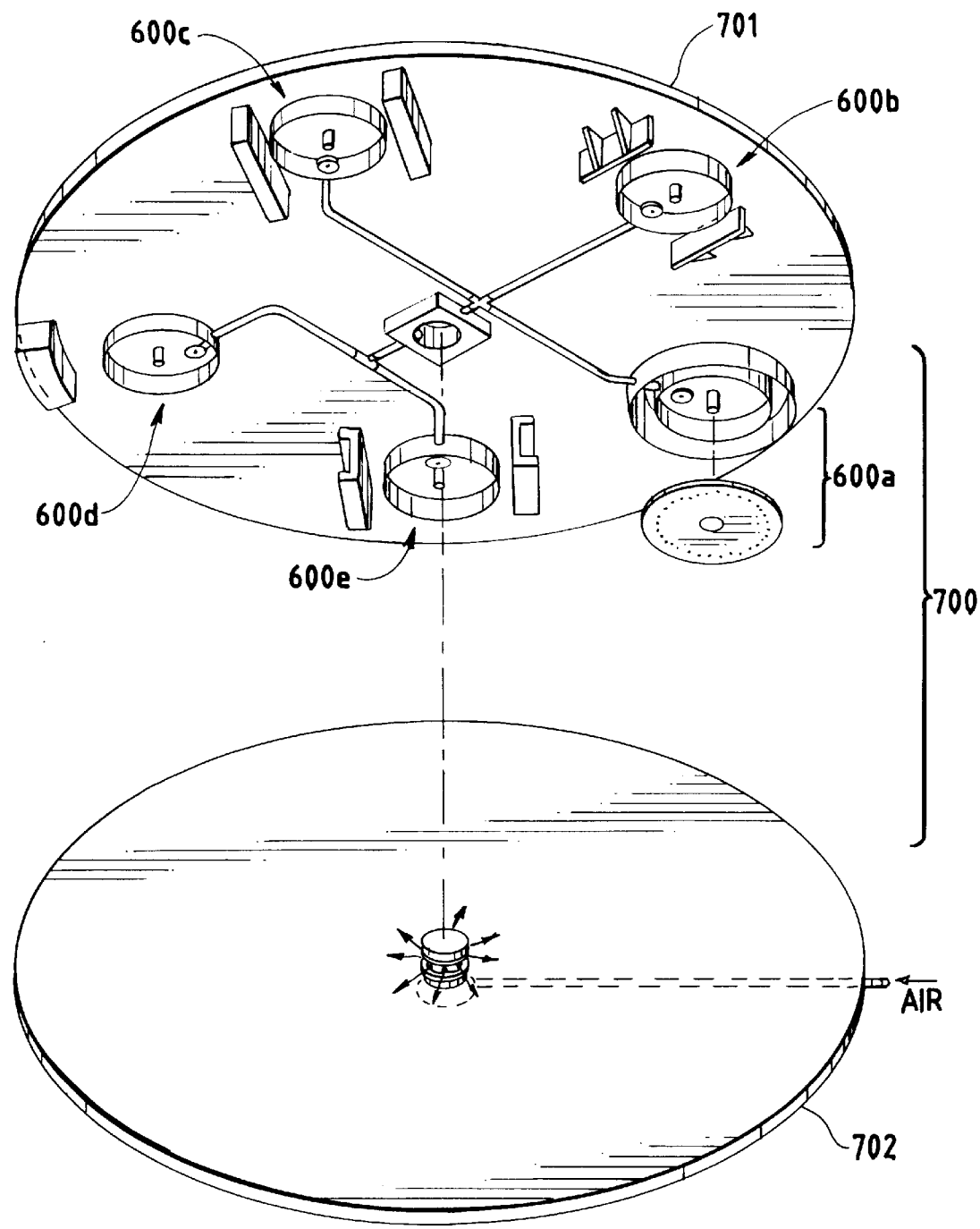
FIG. 10 is an exploded perspective view of a turntable having five different air bearing assemblies mounted to the underside of a rotating platform.

FIG. 10 illustrates a second rotating turntable assembly 700. The turntable top 701 is centered on a bottom plate 702 that contains a pivot. Five air bearing assemblies are attached to its underside. Each of the air bearing assemblies is slightly different in construction to illustrate some of the different suitable assemblies. Air bearing assembly 600a is similar in construction to the assembly shown in FIGS. 1 and 2. Air bearing assemblies 600b, 600c, 600d, and 600e contain an inner ring and accept the same type of air bearing. In place of the outer ring, these assemblies include other support sections adjacent the inner ring to support the load when the air bearings are deflated.

In the various embodiments shown in FIGS. 1 to 6 and 8 to 10, the inner ring for the damping chamber is circular in shape. Non-circular shapes are suitable, provided the overlap of the diaphragm's footprint is uniform so that the gasket sealing pressure is uniform. The inner ring preferably has the same shape as the air bearing. Accordingly, in the case of non-circular air bearings, e.g., square or racetrack shaped, the inner ring preferably is square or racetrack shaped.

6. Use Of The Air Bearing Assembly

The air bearing assembly of this invention is advantageously used in the same ways and for the same purposes as conventional air bearings, namely, for transporting a variety of loads across smooth flat surfaces. The air bearing assembly of this invention is superior to conventional air bearing assemblies for several reasons. First, the lifting force of the air bearing is transferred directly from the floor surface to the planar portion of the frame by a column of compressed air. This reduces weight and cost by eliminating the need for a lower plate to support the backing plate. It also enables the frame to be easily and inexpensively manufactured by casting, molding, or fabrication. Second, the pressurization of the air bearing creates an upward force exerted by the diaphragm upon the backing plate and, in turn, by the backing plate against the inner ring which seals the damping chamber. This greatly simplifies manufacturing by reducing or eliminating the need to seal the damping chamber by welding or the like.

I claim:

1. An air bearing assembly for transporting loads across a smooth and flat surface, the assembly comprising:

(a) a frame having a first side for supporting a load, an opposing second side, an inner ring extending from the second side for partially defining a damping chamber, a mount centrally located within the inner ring for attaching an air bearing, a pressurized air inlet, a pressurized air outlet within the inner ring, and a pressurized air conduit communicating between the pressurized air inlet and the pressurized air outlet; and (b) an air bearing comprising:

(i) a substantially flat backing plate connected to the second side of the frame in an overhanging relationship with the inner ring so that the backing plate has an overhanging area and a non-overhanging area and so that an enclosed damping chamber is defined by the frame and the backing plate, the backing plate having a lip along its periphery, a central mounting hole, a hole within the non-overhanging area through which the pressurized air conduit extends, and an orifice within the non-overhanging area; and (ii) a flexible bulbous diaphragm having a periphery attached to the lip of the backing plate and having a center attached to the backing plate and to the mount of the frame to create an interior space in the diaphragm and an enclosed footprint upon the surface when the air bearing assembly is pressurized, the interior space communicating with the pressurized air outlet and also communicating with the damping chamber through the orifice in the backing plate, the footprint having a size that uniformly overhangs the inner ring so that the footprint has an overhanging area and a non-overhanging area, the overhanging area being less than the non-overhanging area, the diaphragm further having one or more exit holes within the footprint for the flow of air from the interior space in the diaphragm to the atmosphere, the combined cross-sectional areas of the exit holes being substantially less than the cross-sectional area of the conduit so that pressure is maintained in the diaphragm; so that, when the air bearing assembly is pressurized, the damping chamber is sealed by an upward force exerted by the diaphragm upon the backing plate against the inner ring.

2. The air bearing assembly of claim 1 additionally comprising a first compliant gasket between the inner ring and the backing plate and a second compliant seal between the pressurized air outlet and the backing plate.

3. The air bearing assembly of claim 2 wherein the frame additionally comprises a second, radially outward ring extending from the second side for supporting the load when the air bearing is deflated.

4. The air bearing assembly of claim 3 wherein the overhanging area of the footprint is about 10 to 50% of the non-overhanging area.

5. The air bearing assembly of claim 4 wherein the second compliant seal comprises a pneumatic inlet seal.

6. The air bearing assembly of claim 5 wherein the inner ring, backing plate, and diaphragm are circular in shape.

7. The air bearing assembly of claim 6 wherein the outer ring is circular in shape.

8. The air bearing assembly of claim 6 wherein the outer ring is square in shape.

9. The air bearing assembly of claim 6 additionally comprising a tray and a socket that fit between the frame and the air bearing.

10. The air bearing assembly of claim 6 additionally comprising a means for adjusting the size of the orifice in the backing plate.

11. An air bearing assembly for transporting loads across a smooth and flat surface, the assembly comprising:

(a) a frame having a first side for supporting a load, an opposing second side, an inner ring extending from the second side for partially defining a damping chamber, a means for attaching an air bearing, a pressurized air inlet, a pressurized air outlet within the inner ring, and a pressurized air conduit communicating between the pressurized air inlet and the pressurized air outlet; and (b) an air bearing comprising:

(i) a backing plate connected to the second side of the frame in an overhanging relationship with the inner ring so that the backing plate has an overhanging area and a non-overhanging area and so that an enclosed damping chamber is defined by the frame and the backing plate, the backing plate having a mounting hole, a hole within the non-overhanging area through which the pressurized air conduit extends, and an orifice within the non-overhanging area; and (ii) a flexible bulbous diaphragm having a periphery attached to the backing plate and having a center attached to the backing plate and to the frame to create an interior space in the diaphragm and an enclosed footprint upon the surface when the air bearing assembly is pressurized, the interior space communicating with the pressurized air outlet and also communicating with the damping chamber through the orifice in the backing plate, the footprint having a size that uniformly overhangs the inner ring so that the footprint has an overhanging area and a non-overhanging area, the overhanging area being less than the non-overhanging area, the diaphragm further having one or more exit holes within the footprint for the flow of air from the interior space in the diaphragm to the atmosphere, the combined cross-sectional areas of the exit holes being less than the cross-sectional area of the conduit so that pressure is maintained in the diaphragm; so that, when the air bearing assembly is pressurized, the damping chamber is sealed by an upward force exerted by the diaphragm upon the backing plate against the inner ring.

12. The air bearing assembly of claim 11 additionally comprising a compliant gasket between the inner ring and the backing plate and a compliant seal between the pressurized air outlet and the backing plate.

13. The air bearing assembly of claim 12 wherein the frame additionally comprises a second, radially outward ring extending from the second side for supporting the load when the air bearing is deflated.

14. The air bearing assembly of claim 13 wherein the overhanging area of the footprint is about 10 to 50% of the non-overhanging area.

15. The air bearing assembly of claim 14 wherein the compliant seal comprises a pneumatic inlet seal.

16. The air bearing assembly of claim 15 wherein the inner ring, backing plate, and diaphragm are circular in shape.

17. The air bearing assembly of claim 16 wherein the outer ring is circular in shape.

18. The air bearing assembly of claim 16 wherein the outer ring is square in shape.

19. The air bearing assembly of claim 16 additionally comprising a tray and a socket that fit between the frame and the air bearing.

20. The air bearing assembly of claim 16 additionally comprising a means for adjusting the size of the orifice in the backing plate.

* * * * *